United States Patent [19]
Yamanaka et al.

[11] Patent Number: 5,714,978
[45] Date of Patent: Feb. 3, 1998

[54] ADJACENT CURSOR SYSTEM WITH TACTILE FEEDBACK FOR THE BLIND

[75] Inventors: Katsuhiro Yamanaka; Osamu Iseki, both of Tokyo, Japan

[73] Assignee: NEC Corporation, Tokyo, Japan

[21] Appl. No.: 567,468

[22] Filed: Dec. 5, 1995

[30] Foreign Application Priority Data

Dec. 5, 1994 [JP] Japan ................... 6-300838

[51] Int. Cl.$^6$ .................................................. G06F 3/00
[52] U.S. Cl. .................... 345/157; 345/145; 395/340
[58] Field of Search ..................... 345/145–146, 345/156–184, 119–120; 340/825.19; 434/113–115; 395/326–358

[56] References Cited

U.S. PATENT DOCUMENTS

| | | | |
|---|---|---|---|
| 3,395,247 | 7/1968 | Fieldgate | 178/17 R |
| 4,644,339 | 2/1987 | Ruder | 345/130 |
| 5,165,897 | 11/1992 | Johnson | 434/113 |
| 5,185,561 | 2/1993 | Good et al. | 345/156 |
| 5,223,828 | 6/1993 | McKiel, Jr. | 340/825.19 |
| 5,287,102 | 2/1994 | McKiel, Jr. | 340/825.19 |
| 5,412,189 | 5/1995 | Cragun | 235/379 |
| 5,429,140 | 7/1995 | Burdea et al. | 345/156 X |
| 5,453,012 | 9/1995 | Hudedek | 434/114 |
| 5,588,839 | 12/1996 | Shimoda | 434/114 |
| 5,627,567 | 5/1997 | Davidson | 345/173 |

FOREIGN PATENT DOCUMENTS

| | | |
|---|---|---|
| 1260523 | 10/1989 | Japan . |
| 4286015 | 10/1992 | Japan . |
| 5313820 | 11/1993 | Japan . |

OTHER PUBLICATIONS

Ian A. Pitt et al. "Pointing in an Auditory Interface for Blind Users" IEEE Systems, Man, and Cybernetics, 1995 International Conference pp. 280–285, Jan. 1995.

Burger "Improved Access to Computers for the Visually handicapped: New Prospects and Principles" IEEE Transactions on Rehabilitation Engineering pp. 111–117, Sep. 1994.

Shimago "A survey of Perceptual Feedback Issues in Dextrous Telemanipulation: Part I. Finger Force Feedback" IEEE Virtual Reality, 1993 Int'l Symposium pp. 263–270, Jan. 1993.

Shimago "A survey of Perceptual Feedback Issues in Dextrous Telemanipulation: Part II. Finger Touch Feedback" IEEE Virtual Reality, 1993 Int'l Symposium pp. 271–279, Jan. 1993.

Cowart "Mastering Windows 3.1" Sybex p. 9, Jan. 1993.

Comerford "Seeing Eye Mouse" IBM Technical Disclosure Bulletin vol. 28, No. 3 pp. 1343–1344, Aug. 1985.

Affinits "Braille Computer Mouse with Tactile Position Feedback" IBM Technical Disclosure Bulletin vol. 31, No. 12 p. 386, May 1989.

*Primary Examiner*—John E. Breene
*Attorney, Agent, or Firm*—Sughrue, Mion, Zinn, Macpeak & Seas, PLLC

[57] ABSTRACT

In a pointing system for use in notifying an operator of a cursor position on a display without relying on a sense of sight, information is derived in relation to an interactive item from a plurality of positions which are adjacent to the cursor position. A tactile sense or an inner force sense is determined by a relationship of the interactive items between the cursor position and the adjacent positions. The tactile sense may be displayed by a tactile display while the inner force sense, by a movable stage controllable by braking units. An absolute coordinate system may be used to indicate a position of the tactile display or the movable stage and is in one-to-one correspondence to a coordinate system of the display.

4 Claims, 8 Drawing Sheets

| 0 | 0 | 0 | 0 | 1000 | 1000 | 1000 |
|---|---|---|---|------|------|------|
| 0 | 0 | 0 | 0 | 1000 | 1000 | 1000 |
| 0 | 0 | 0 | 0 | 1000 | 1000 | 1000 |
| 0 | 0 | 0 | 0 | 1000 | 1000 | 1000 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

FIG. 4A

| 0 | 0 | 0 | 0 | 1000 | 0 | 0 |
|---|---|---|---|------|---|---|
| 0 | 0 | 0 | 0 | 1000 | 0 | 0 |
| 0 | 0 | 0 | 0 | 1000 | 0 | 0 |
| 0 | 0 | 0 | 0 | 1000 | 1000 | 1000 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

FIG. 4B

| 1000 | 1000 | 1000 | 0 | 1000 |
|---|---|---|---|---|
| CURSOR POSITION | UPPER SIDE | LOWER SIDE | LEFTHAND SIDE | RIGHTHAND SIDE |

| 1000 | 0 | 0 | 1000 | 0 |
|---|---|---|---|---|
| CURSOR POSITION | UPPER SIDE | LOWER SIDE | LEFTHAND SIDE | RIGHTHAND SIDE |

ADJACENT CURSOR SYSTEM WITH TACTILE FEEDBACK FOR THE BLIND

BACKGROUND OF THE INVENTION

This invention relates to a pointing system for use in pointing a coordinate position by manipulating a graphical user interface which is included in an interactive information processing system, such as a personal computer system.

In general, an interactive information processing system of the type described has a graphical user interface which facilitates manipulation of the processing system. Specifically, a plurality of interactive items are visually displayed together with a cursor on a screen of a display unit to specify operations to be selected by an operator. The operator selects one of the interactive items by the use of a pointing unit, such as a mouse, a ball, to carry out a desired one of the operations. In this event, the operator should adjust the cursor to a desired interactive item by moving the pointing unit, visually watching the cursor and the interactive items. Such visual adjustment of the cursor and the interactive items imposes a burden on a sense of sight of the operator, as well known in the art.

A wide variety of proposals have been offered so as to lighten the burden on the sense of sight. For example, a pointing system disclosed in Japanese Unexamined Patent Publication No. Hei 4-286015, namely, 286015/1992, has a scheme which informs an operator by a tactile sense of the fact that the cursor is entered within a predetermined range adjacent to one of the interactive items.

Instead of the tactile sense, an inner force sense may be used to inform an operator of approach of the cursor to one of the interactive items, as mentioned in Japanese Unexamined Patent Publication No. Hei. 5-313820, namely, 313820/1993.

With both the above-mentioned structures, the operator initially visually watches the cursor and the interactive items to thereafter confirm the positions of the cursor and one of the interactive items and to determine a movement direction of the cursor. Thereafter, the operator may move the cursor along the movement direction until approach of the cursor to the selected interactive item is notified by the tactile sense or by the inner force sense. In this event, the operator may not gaze the cursor during the movement of the mouse Because a final position of the cursor is notified by the tactile sense or by the inner force sense.

However, the cursor may not be always conveniently moved along the direction initially determined, without gazing the cursor. This means that the cursor may be often located at a position of another interactive item different from the selected interactive item. Therefore, the operator should visually confirm whether or not the cursor is correctly located on the selected interactive item. In addition, even when the cursor is correctly positioned on the selected interactive item, the operator can recognize neither a configuration of a zone assigned to the selected interactive item nor a local position of the cursor in the zone.

Furthermore, the pointing unit, such as the mouse, the ball, should be moved on a plane to indirectly indicate the position of the cursor. Specifically, a current position is determined by calculating a variation between the current position of the cursor and a previous position. This means that a relative position is determined on a relative coordinate of the plane along which the pointing unit is moved.

Alternatively, another proposal has been directed to a pointing system which can move a cursor horizontally or vertically, regardless of movement of a mouse, as disclosed in Japanese Unexamined Patent Publication No. Hei 1-260523, namely, 260523/1989. With this structure, inco-incidence takes place between the movement of the cursor and the movement of the mouse. This makes control of both the mouse and the cursor difficult.

At any rate, each of the above-enumerated pointing systems is never gentle for a person who has a handicap in the sense of sight.

For example, the handicapped person can not easily recognize the relative coordinate and can therefore fail to skillfully manipulate the pointing unit. In addition, the handicapped person can not know where the cursor is positioned even when selection of one of the interactive items is informed by the tactile sense or the inner force sense. This is because the tactile sense or the inner force sense is invariable as long as the cursor is located in a zone assigned to each of the interactive items no matter where the cursor is positioned.

SUMMARY OF THE INVENTION

It is an object of this invention to provide a pointing system which is gentle and convenient for a handicapped person who has a handicap in the sense of sight.

It is another object of this invention to provide a pointing system of the type described, which is capable of precisely notifying an operator of a position of a cursor even when the cursor is located within a zone assigned to an interactive item displayed on a screen.

It is still another object of this invention to provide a pointing system of the type described, which is capable of informing an operator of a species of a selected interactive item.

It is yet another object of this invention to provide a pointing system of the type described, which can match a movement of the cursor coincide with a movement of a pointing unit or a movable stage.

According to an aspect of this invention, a method is for use in indicating a coordinate position on a screen of a graphical user interface in an interactive system. The method comprises the steps of displaying visible items on the screen, locating a cursor movable on the screen, detecting a position of the cursor as the coordinate position in relation to the visible items, preparing a tactile sensor, and driving the tactile sensor in dependency upon a position relationship between the position of the cursor and at least one of the visible items to notify the position relationship.

According to another aspect of this invention, a pointing system is for use in an interactive system to indicate a coordinate position on a screen of a graphical user interface by moving a cursor on the screen. The pointing system comprises a display panel which has a screen, for displaying visible items on the screen, a position detecting unit for detecting a position of the cursor in relation to the visible items as the coordinate position to produce a position signal representative of the position, a relation detecting circuit for detecting a relationship between the position of the cursor and at least one of the visible items to produce a relationship signal representative of a relationship between the position and at least one of the visible items and a tactile display unit driven by the relationship signal for providing a tactile sense determined by the relationship signal.

According to a further aspect of this invention, a pointing system comprises a display panel, which has a screen defined by a predetermined coordinate, for displaying visible items on the screen, a coordinate defining unit for providing a unit coordinate which is in one-to-one correspondence to the predetermined coordinate, a pointer unit movable on the unit coordinate, and driving means for driving the pointer unit along the unit coordinate.

BRIEF DESCRIPTION OF THE DRAWING

FIGS. 4(A) and (B) are views for use in describing operation of the pointing system shown in FIG. 1;

DESCRIPTION OF THE PREFERRED EMBODIMENTS

Figure 1:
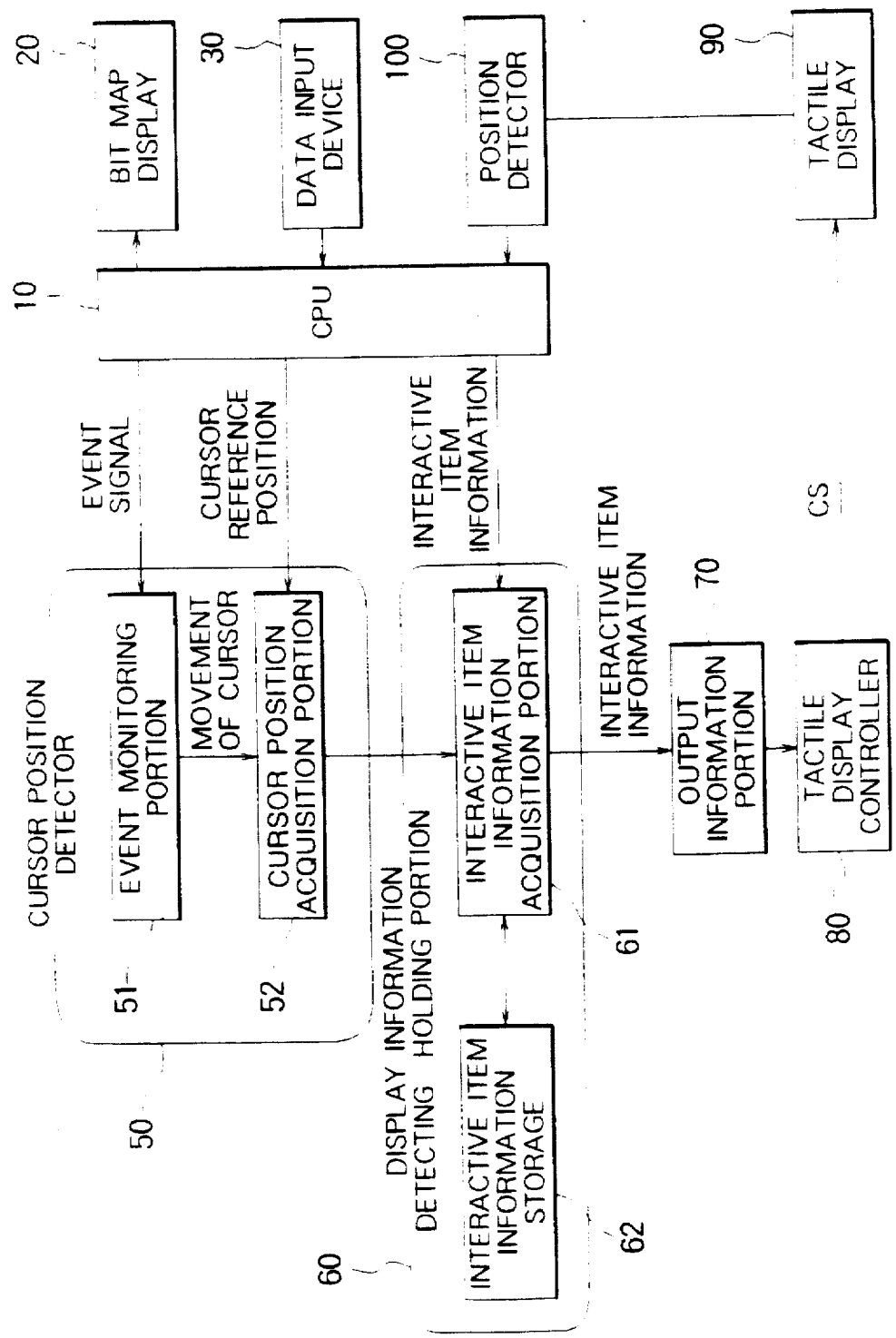
FIG. 1 is a block diagram of a pointing system according to a first embodiment of this invention.

Referring to FIG. 1, a pointing system according to a first embodiment of this invention is practically implemented by an information processing system. In this connection, the illustrated pointing system comprises a central processing unit (CPU) 10, a bit map display 20, and a data input device 30. The bit map display 20 defines a screen on which a cursor and visible or interactive items are displayed.

The central processing unit (CPU) 10, the bit map display 20, and the data input device 30 form a graphical user interface of an interactive type.

In addition, a cursor position detector 50, a screen information detecting/holding portion 60, an output information producing portion 70, a tactile display controller 80, and a tactile display 90, and a position detector 100 are included in the illustrated pointing system. Specifically, the cursor position detector 50 detects a current position of the cursor moved on the bit map display 20 while the screen information detecting/holding portIon 60 is connected to the cursor position detector 50 and serves to extract visual information of interactive items from a region located in the vicinity of the cursor currently displayed on the bit map display 20. The output information producing portion 70 is operable to convert the visual information into a data signal sequence which can be displayed by the tactile display 90 and which will be called a tactile signal sequence. Supplied with the tactile signal sequence, the tactile display controller 80 produces a control signal CS related to the tactile signal sequence to control the tactile display 90.

The tactile display 90 is operable to provide a tactile sense in accordance with the control signal CS in a manner to be described later. A position or location of the tactile display 90 is detected by the position detector 100.

In the illustrated example, the cursor position detector 50 includes an event monitoring portion 51 and a cursor position acquisition portion 52. The event monitoring portion 51 monitors a movement of the cursor in response to an event signal supplied from the CPU 10 to notify the cursor position acquisition portion 52 of the movement of the cursor. On the other hand, the cursor position acquisition portion 52 acquires a current cursor position in a coordinate In response to notification of the movement of the cursor sent from the event monitoring portion 51. The coordinate is defined in the screen of the bit map display 20.

Subsequently, the current cursor position in the coordinate is given from the cursor position acquisition portion 52 to the screen information detecting/holding portion 60. The illustrated screen information detecting/holding portion 60 includes an interactive item information acquisition portion 61 and an interactive item information storage 62. The interactive item information acquisition portion 61 acquires, from the CPU 10, interactive item information which is representative of an interactive item present at the cursor position detected by the cursor position detector 50. The interactive item Information is successively stored in the interactive item information storage 62.

At any rate, the cursor position detector 50 and the screen information detecting/holding portion 60 are practically formed by software.

Figure 2:
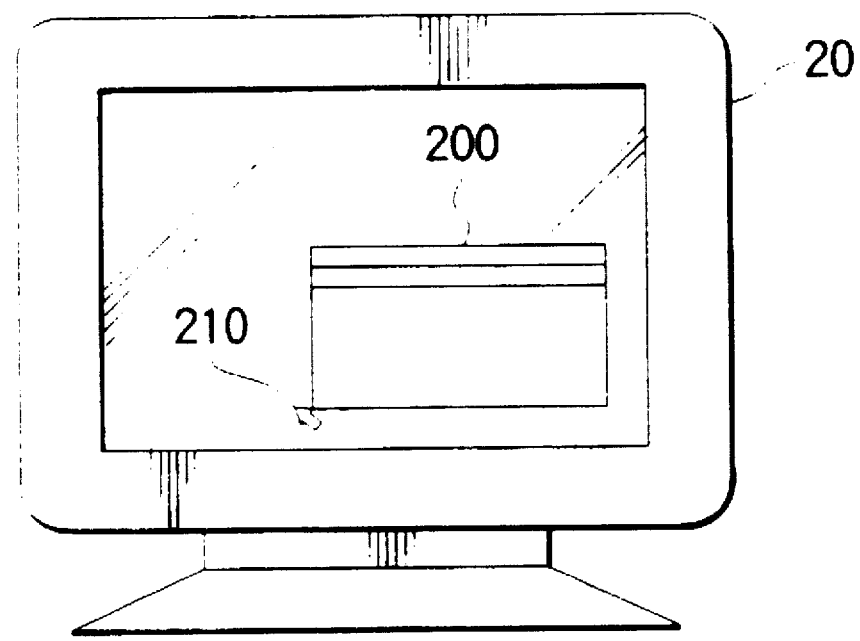
FIG. 2 exemplifies an image displayed in a bit map display so as to describe operation of the pointing system.

Referring to FIGS. 2, 3(A) and 3(B), 4(A) and 4(B), and 5 together with FIG. 1, description will be made as regards operation of the pointing system illustrated in FIG. 1. At first, the bit map display 20 illustrated in FIG. 2 is prepared as the graphical user interface and has a screen. In FIG. 2, it is assumed that a window 200 is displayed on the screen of the bit map display 20 as one of interactive items along with the cursor depicted at 210.

Figure 3A:
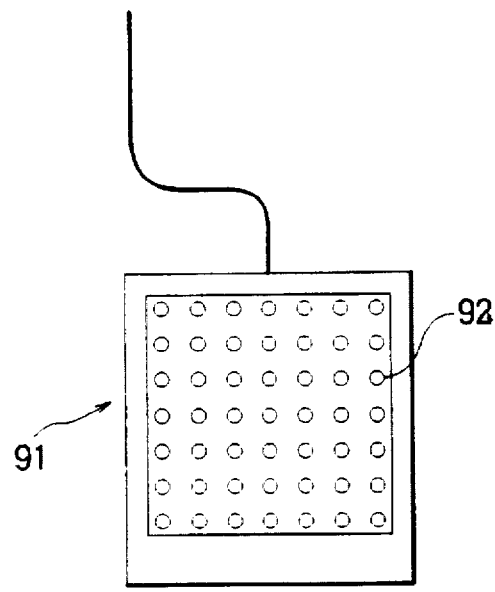
FIGS. 3(A) and (B) are views for use in describing a tactile display used in the pointing system illustrated in FIG. 1.
Figure 3B:
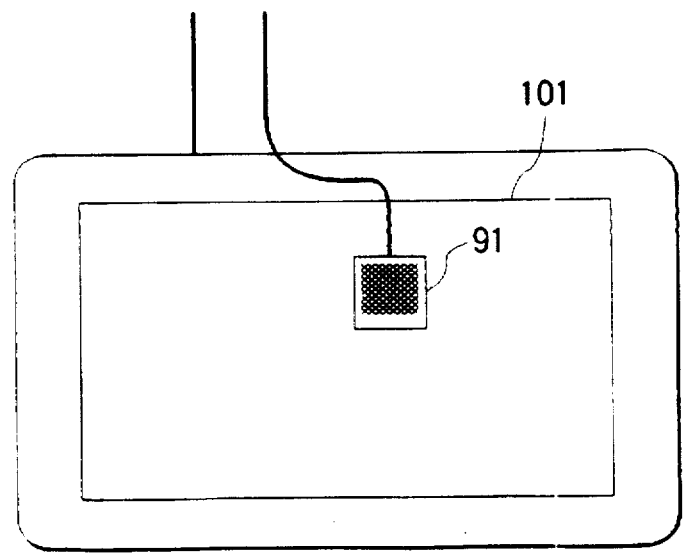

As shown in FIG. 3(A), a pin display 91 is prepared as the tactile display 90 and has a plurality of pins which are arranged in seven rows ann seven columns (7×7) and which are individually movable upwards of FIG. 3(A). Such pins can give tactile senses to an operator when they are projected upwards. As illustrated in FIG. 3(B), the pin display 91 illustrated in FIG. 3(A) is located on a touch panel 101 which is prepared as the position detector 100 (FIG. 1).

With this structure, not only the position of the cursor 210 but also image information adjacent to the cursor 210 can be indicated or displayed on the pin display 91 by tactile senses given by the pins 92. In other words, it is possible to display both the cursor 210 and an interactive item or items adjacent to the cursor 210 on the pin display 91 over a predetermined region. Therefore, an operator can detect a distance between the cursor 210 and the interactive item or items without observing or watching the screen of the bit map display 20.

Alternatively, the pin display 91 may be, for example, of a type of mechanically vibrating pins arranged in a matrix.

At any rate, the pin display 91 is placed on the touch panel 101 in the manner illustrated in FIG. 3(B). In this case, the cursor 210 is partially overlapped at an upper right part with the window 200 on the screen of the bit map display 20, as shown in FIG. 2.

Herein, the touch panel 101 defines a coordinate system of the pin display 91. In the example being illustrated, the coordinate or a coordinate system of the pin display 91 may be relatively defined relative to a coordinate system of the screen formed on the bit map display 20. This means that each position of the pin display 91 on the touch panel 101 may not always be in one-to-one correspondence to each position of the screen on the bit map display 20.

In this situation, when the operator moves the pin display 91 on the touch panel 101, pin coordinate values on the touch panel 101 are transmitted as coordinate positions through the position detector 100 to the CPU 10 to specify a position of the pin display 91 on the touch panel 101. On the other hand, the CPU 10 detects cursor coordinate values representative of a position of the cursor 210 on the screen of the bit map display 20.

The CPU 10 substitutes the pin coordinate values for the cursor coordinate values and issues the event signal representative of occurrence of a movement of the cursor 210. Thus, the cursor coordinate values are renewed An response to the pin coordinate values. The event signal is delivered to the event monitoring portion 51 of the cursor position detector 50. Thus, a combination of the CPU 10 and the cursor position detector 50 serves to detect the position of the cursor 210 on the screen of the bit map display 20 and may be called a position detecting unit.

The event monitoring portion 51 always monitors the event signal issued from the CPU 10. When the event signal is detected by the event monitoring portion 51, detection of the event signal is transmitted to the cursor position acquisition portion 52. On the detection of the event signal, the cursor position acquisition portion 52 is given a current position of the cursor 210 which is sent to the screen information detecting/holding portion 60.

In the screen information detecting/holding portion 60, the interactive item information acquisition portion 61 is operated in response to the current position of the cursor 210 and the interactive item information given from the CPU 10. Specifically, the interactive item information may be represented by an identification number which is assigned to each interactive item that resides within the predetermined region determined by the pin display 91. As illustrated in FIG. 3, the pin display 91 has a center point coincident to the position of the cursor 210 and defines the predetermined region formed by seven rows and seven columns (7×7) around the center point, as mentioned before. This shows that the predetermined region is defined by forty-nine dots of the pins.

The illustrated interactive item information acquisition portion 61 of the screen information detecting/holding portion 60 obtains or acquires, from the CPU 10, the identification numbers dispersed within the predetermined region defined by the forty-nine dots. The identification numbers of the forty-nine dots are successively stored within the interactive item information storage 62. After the identification numbers of forty-nine dots are all stored in the interactive item information storage 62, they are sent from the interactive item information acquisition portion 61 to the output information producing portion 70.

Pot example, it is assumed that an identification number of 1000 is assigned to the window 200 shown in FIG. 2 and that no existence of any interactive item be specified by 0. As shown in FIG. 2, when the predetermined region defined by the tactile display 90 is partially overlapped with the window 200 at a right upper portion of the tactile display 90, the identification numbers "1000" are gathered in the form of an interactive item zone at a right upper part of the forty-nine dots with the remaining part filled with 0, as exemplified by a number pattern in FIG. 4(A).

Herein, let the output information producing portion 70 detect a boundary or an edge of the interactive item zone to produce an output signal which is representative of the boundary of the interactive item zone and which serves to project the pins corresponding to the boundary of the interactive item zone.

To this end, the output information producing portion 70 keeps the identification numbers "1000" arranged on the boundary of the interactive item zone and renders the remaining zone into zero, as illustrated in FIG. 4(B). The above-mentioned operation can readily be carried out in a known manner. At any rate, the output information portion 70 supplies the tactile display controller 80 with a tactile display state signal appearing as a result of the above-mentioned operation. The tactile display state signal is representative of a relationship between the position of the cursor 210 and each of the inter-active items and may be called a relationship signal indicative of the above-mentioned relationship. In this connection, a combination of the screen information detecting/holding portion 60 and the output information producing portion 70 will be referred to as a relation detecting unit for detecting the above relationship.

Responsive to the tactile display state signal, the tactile display controller 80 produces the control signal CS so as to project the pins on the tactile display 90 at a position which corresponds to the identification number "1000". In other words, the pins of the tactile display 90 are not projected at positions specified by the identification number of zero.

Figure 5:
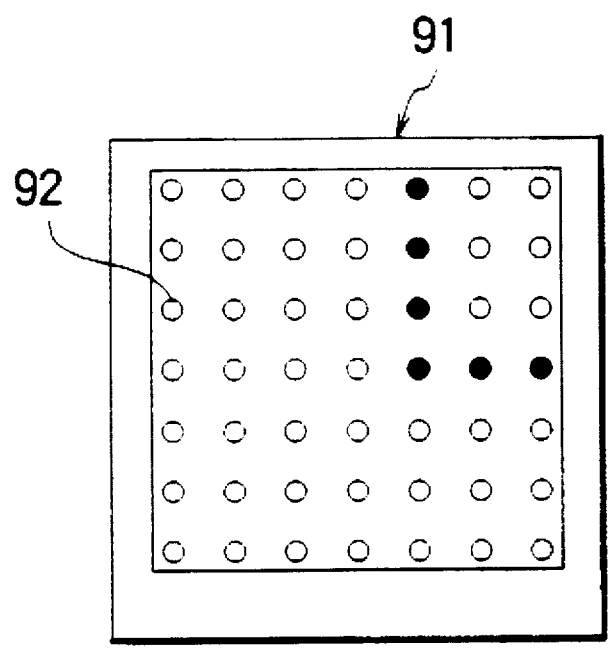
FIG. 5 is a plan view for use in describing a pin display used as the tactile display.

As a result, six of the pins 92 are projected upwards on the pin display 91, as shown by the black circles in FIG. 5. Thus, a combination of the tactile display controller 80 and the tactile display 90 may be referred to as a tactile display unit.

Therefore, the operator can recognize the interactive item is present at the upper right portion of the tactile display 90 without watching the screen on the bit map display 20.

The operator moves the tactile display 90 on the touch panel 101 in response to the tactile sense. As a result, a movement result signal is produced from the touch panel 101 and is fed back to the position detector 100. Therefore, the pin display 91 and the touch panel 101 may be collectively called the tactile display 90.

Figure 6:
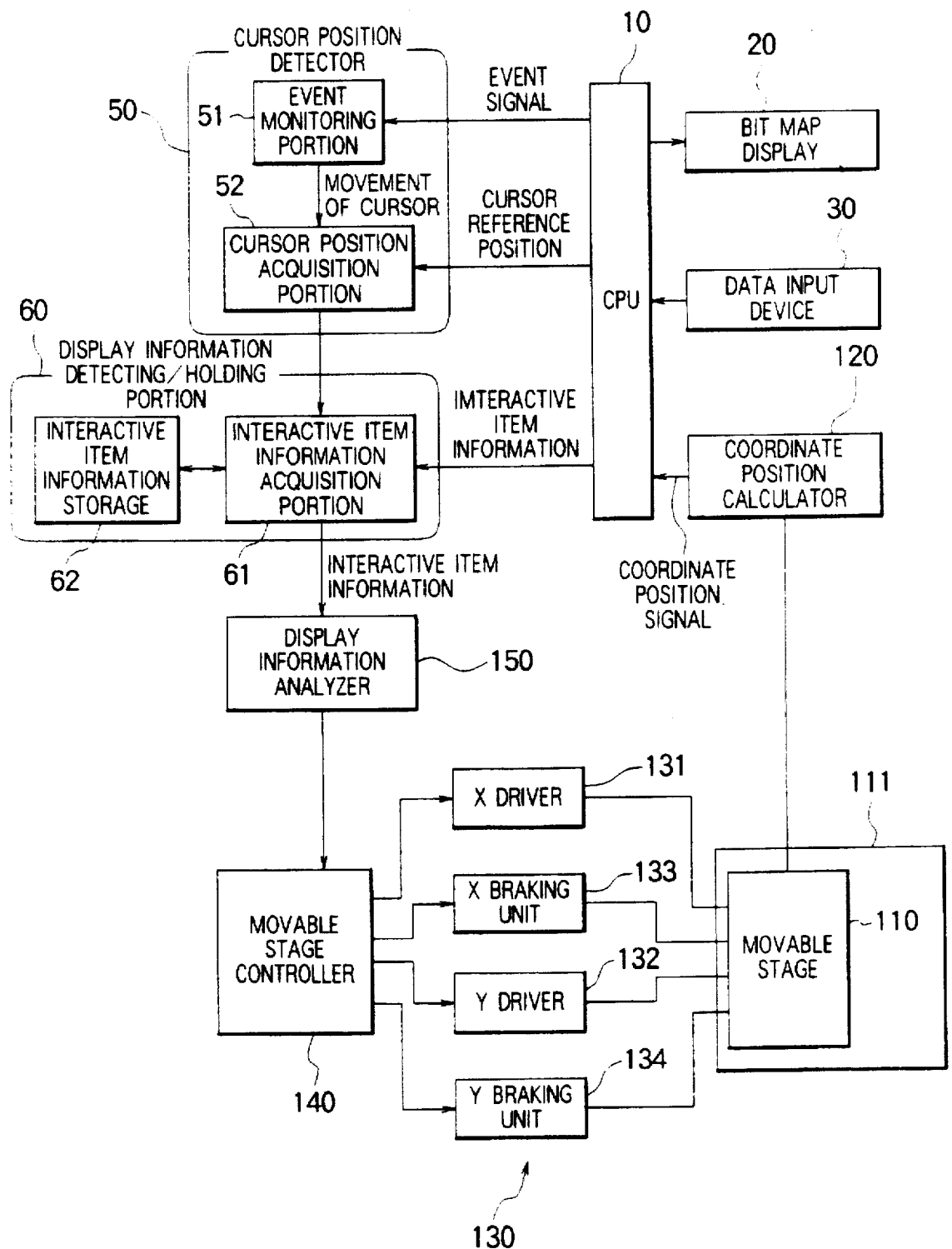
FIG. 6 is a block diagram of a pointing system according to a second embodiment of this invention.
Figures 7, 8A, 8B:
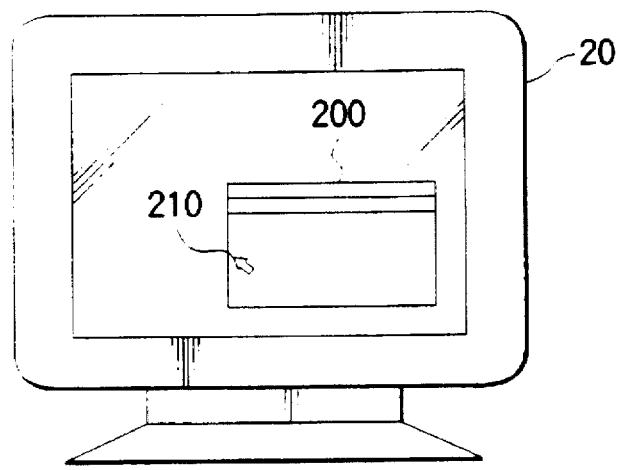
FIG. 7 exemplifies an image displayed on a bit map display used in the pointing system illustrated in FIGS. 8(A) and (B) show data formats for use in describing operation of the pointing system illustrated in FIG. 6.

Referring to FIG. 6 together with FIG. 7, a pointing system according to a second embodiment of this invention comprises similar parts designated by like reference numerals. In FIG. 6, the pointing system serves to inform an operator of a position of a cursor 210 (FIG. 7) in relation to interactive items, such as a window 200 (FIG. 7), by the use of an inner force sense and a movable stage or unit 110 in a manner to be described later in detail. The movable stage 110 will be referred to as a pointer unit.

More specifically, the illustrated pointing system includes the CPU 10, the bit map display 20 (FIG. 7), the data input device 30, the cursor position detector 50, and the screen information detecting/holding portion 60 like in FIG. 1. The cursor position detector 50 and the screen information detecting/holding portion 60 may be similar to those illustrated in FIG. 1, respectively. Therefore, the cursor position detector 50 is composed of the event monitoring portion 51 and the cursor position acquisition portion 52 while the screen information detecting/holding portion 60 is composed of the interactive item information acquisition portion 61 and the interactive item information storage 62.

In addition, the movable stage 110 may be, for example, a pen which is used in an X-Y plotter and which is movable along a predetermined area depicted at 111 in FIG. 6. The predetermined area may have a rectangular shape which is defined by an X-axis and Y-axis. Practically, the predetermined area is given by a panel as shown in FIG. 3(B) and is in one-to-one correspondence to the screen defined on the bit map display 30. In this connection, it is to be noted that the predetermined area defines an absolute coordinate system which may be called a unit coordinate system.

In order to detect a position of the movable stage 110 on the absolute coordinate system, a coordinate position calculator 120 is electrically connected to the movable stage 110 to supply the CPU 10 with a coordinate position signal representative of the position on the absolute coordinate system.

A drive unit 130 is coupled to the movable stage 110 to drive the movable stage 110 along the absolute coordinate system defined within the predetermined area. The illustrated drive unit 130 includes an X driver 131 for driving the movable stage 110 in a direction of the X-axis and a Y driver 132 for driving the movable stage 110 in a direction of the Y-axis. Moreover, the drive unit 130 further includes an X braking unit 133 for braking movement of the movable stage 110 in the X-axis direction and a Y braking unit 134 for braking an operation or a movement of the movable stage 110 in the Y-axis direction.

A movable stage controller 140 is coupled to the X driver 131, the Y driver 132, the X braking unit 133, and the Y braking unit 134 to deliver a sequence of commands to them and to control the movement of the movable stage 110. The movable stage controller 140 is connected to a display information analyzer 150 which analyzes current states of the cursor 210 related to the interactive items, such as the window 200 in a manner to be described.

In the illustrated example, it is assumed that the inner force sense is given to the operator by the X and the Y braking units 133 and 134 when the cursor 210 reaches an edge of each interactive item displayed on the bit map display 20. Specifically, let the cursor 210 be located at a lefthand side edge of the window 200 which may be considered as one of the interactive items, as illustrated in FIG. 7. Under the circumstances, when the operator moves the movable stage 110 (FIG. 6), the coordinate position calculator 120 detects the position of the movable stage 110 on the absolute coordinate system and calculates in absolute coordinate position of the cursor 210 on the screen of the bit map display 20 from the position of the movable stage 110. As a result, the coordinate position calculator 120 supplies the CPU 10 with an absolute position-signal representative of the absolute coordinate position of the cursor 210. The CPU 10 moves the cursor 210 in response to the absolute position signal to the absolute position indicated by the movable stage 110 on one hand and supplies the event monitoring portion 51 with the event signal on the other hand.

When the event signal is received, the event monitoring portion 51 notifies the cursor position acquisition portion 52 of reception of the event signal. Notification of the event signal allows the cursor position acquisition portion 52 to receive a current coordinate position of the cursor 210 from the CPU 10 and to supply the screen information detecting/holding portion 60 with a current coordinate position signal indicative of the current coordinate position of the cursor 210.

In the screen information detecting/holding portion 60, the interactive item information acquisition portion 61 is given the current coordinate position of the cursor 210 from the CPU 10. The current coordinate position of the cursor 210 is assumed to be given in the form of a dot. In this event, the CPU 10 supplies the interactive item information acquisition portion 61 with identification number assigned to the current coordinate position together with identification numbers assigned to four dots assigned to upper and lower sides and righthand and lefthand sides of the current coordinate position of the cursor 210.

All of the identification numbers assigned to the current coordinate position and to the four dots adjacent to the current coordinate position are stored in the Interactive item information storage 62. In this situation, when processing is finished in connection with the five dots in the interactive item information acquisition portion 61, the identification numbers of the five acts are sent to the display information analyzer 150 as the interactive item information.

Referring to FIGS. 8(A) and 8(B) along with FIG. 7, a data sequence is exemplified which is stored as the identification numbers in the interactive item information storage 62, on the assumption that the cursor 210 is located at the edge of the lefthand side within the window 200, as shown in FIG. 7, and that the identification number of 1000 is assigned to the window 200.

Under the circumstances, the data sequence is composed of a single row and five columns allocated to the current coordinate position and the four dots placed at the upper, the lower, the lefthand, and the righthand sides, respectively, as shown in FIG. 8(A).

Since the cursor 210 is located at the edge of the lefthand side within the window 200 in the illustrated example, the identification number of 1000 is loaded with the columns for the cursor position, the upper side, the lower side, and the righthand side except the column for the lefthand side. This is because no interactive item is present on the lefthand side of the current cursor position, in this example.

In FIG. 6, the data sequence shown in FIG. 8(A) is sent from the interactive item information acquisition portion 61 to the display information analyzer 150. The display information analyzer 150 processes the data sequence into a processed data sequence divided into five columns for the cursor position, the upper side, the lower side, the lefthand side, and the righthand side, as illustrated in FIG. 8(B).

Herein, the display information analyzer 150 calculates absolute values of differences between the identification number of the cursor position and the other identification numbers of the upper, the lower, the lefthand, and the righthand sides. As, a result, the identification number of 1000 is kept at the columns for the cursor position and the lefthand side with the remaining columns kept at 0, as shown in FIG. 8(B).

Such a processed data sequence is sent from the display information analyzer 150 to the movable stage controller 140. The display information analyzer 150 selectively drives the X driver 131, the Y driver 132, the X braking unit 133, and the Y braking unit 134 response to the processed data sequence, as shown in FIG. 8(B). For example, the movable stage controller 140 drives the X braking unit 133 only when either one of the columns for the lefthand and the righthand sides In the processed data sequence keeps non-zero. On the other hand, the movable stage controller 140 drives the Y braking unit 134 only when either one of the columns for the upper and the lower sides in the processed data sequence keeps non-zero. This means that the X braking unit 133 is operable to suppress the movement of the cursor 210, namely, the movable stage 110 along the X-axis when no interactive item is present along the columns for the lefthand and the righthand sides of the processed data sequence. Likewise, the Y braking unit 134 is operable to suppress the movement of the cursor 210 along the Y axis.

In FIG. 8(B), the absolute value of 1000 assigned to the column for the lefthand side of the processed data sequence. Therefore, the X braking unit 133 is driven by the movable stage controller 140 to suppress the movement of the movable stage 110 along the X axis. From this fact, it is readily understood that the operator can recognize the edge or boundary of the interactive item, namely, the window 200 without watching or observing the screen of the bit map display Although the X and the Y braking units 133 and 134 are used in the illustrated example, any other braking may be used in the pointing system. For example, weak braking force may be imposed on the movable stage 110 as compared with braking force of the X and the Y braking units 133 and 134. At the boundary of each interactive item, the movable stage 110 may be given a sense of instantaneously stopping the movable stage 110. Any other methods may be applied to give an inner force sense.

In addition, an inner force sense may be fed back to the movable stage 110 not only at the boundary of each interactive item but also at a center position of each interactive item. Furthermore, it is possible in FIG. 7 to prohibit the cursor from being introduced into the window by forcibly moving the movable stage 110 leftwards.

Figure 9:
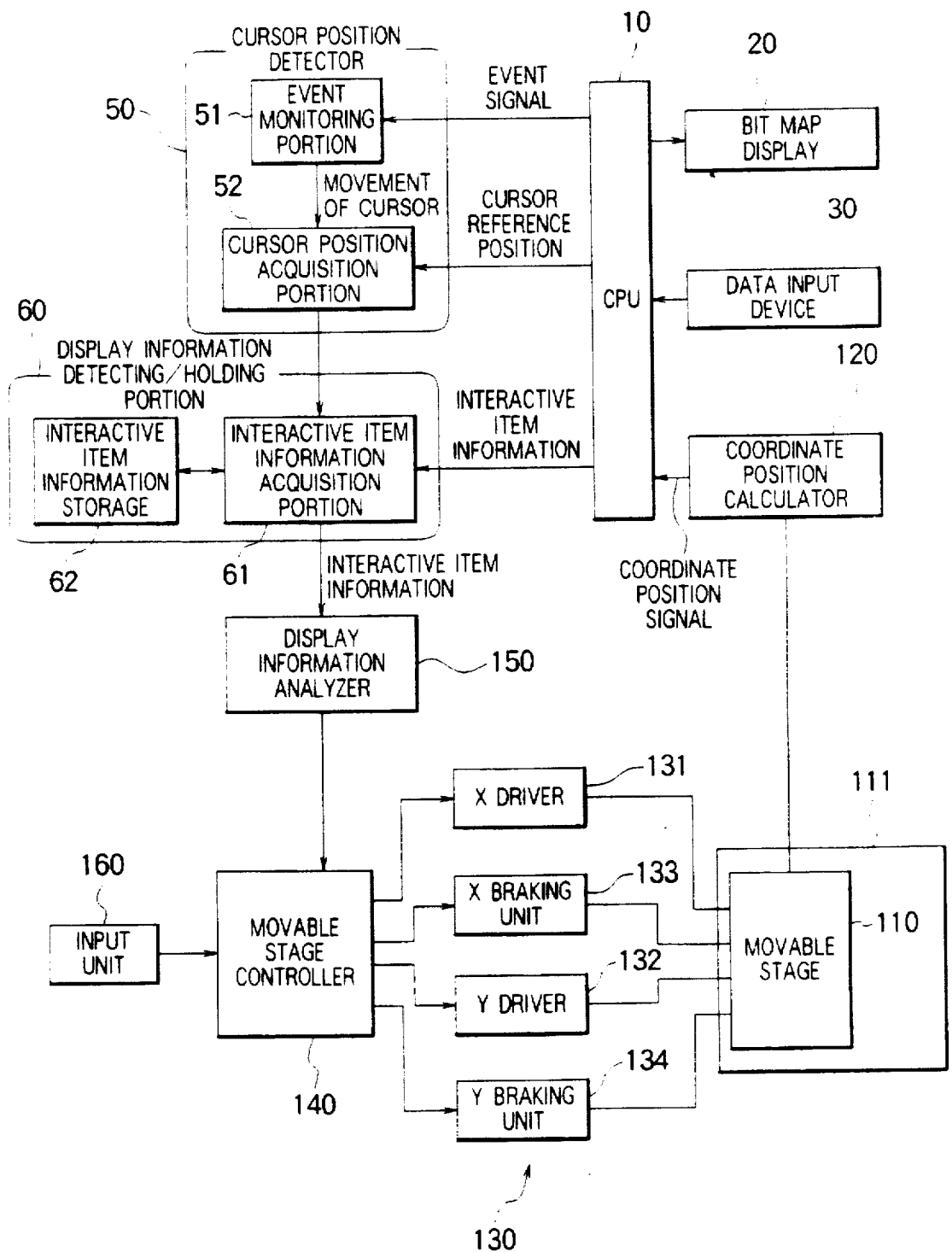
FIG. 9 is a block diagram of a pointing system according to a modification of the second embodiment illustrated in FIG. 6.

Referring to FIG. 9, a pointing system according to a modification of the second embodiment illustrated in FIG. 6 is similar in structure and operation to that illustrated in FIG. 6 except that an input unit 160 is include a in the pointing system illustrated in FIG. 9. The illustrated input unit 160 serves to move the movable stage 110 in a direction indicated by an operator. More specifically, the input unit 160 is operated on moving the cursor 210 in a horizontal direction or a vertical one straightforwards. In this event, the operator instructs or indicates to move the cursor by the use of the input unit 160 in the horizontal or the vertical direction straightforwards before the movable stage 110 is driven. When the instruction is received by the movable stage controller 140, the movable stage controller 140 issues an indication only to the X driver 131 to prohibit the movable stage 110 from being moved in the vertical direction when the horizontal movement instructed. This is because the Y driver 132 is not driven by the movable stage controller 140.

On the other hand, when the instruction indicates the vertical movement of the movable stage 110, the movable stage controller 140 controls the driver 130 so that the Y driver alone is driven. This movement of the movable stage 110 is completely matched with a movement of a hand of the operator.

With this structure, it is possible to automatically move a coordinate position indicated by the operator by using the X driver 131 and the Y driver 132.

At any rate, an interactive item adjacent to the cursor can be recognized by a tactile sense. This is very helpful to lighten a burden imposed on a sense of sight of an operator, especially, a handicapped person who has a handicap in a sense of sight.

While this invention has thus far been described in conjunction with a few embodiments thereof, it will readily be possible for those skilled in the art to put this invention into practice in various other manners. For example, the movable stage 110 illustrated in FIGS. 6 and 9 may be replaced by the pin display 91 illustrated in FIG. 1. On the other hand, the movable stage 110 may be used in FIGS. 6 and 9 instead of the pin display 91. In addition, various types of pointer units may be used as the tactile display 90 or the movable stage 110 to provide the tactile sense and/or the inner force sense.

At any rate, interactive item information may be extracted from the cursor position and a plurality of positions placed around the cursor position so as to specify a relationship among the interactive information. In addition, different identification numbers may be assigned to different interactive items and may be distinguished by different tactile senses or inner force senses.

What is claimed is:

1. A method of indicating a coordinate position on a screen of a graphical user interface in an interactive system by displaying visible items on said screen together with a cursor movable on said screen, said method comprising the steps of:

detecting a position of the cursor as said coordinate position in relation to said visible items;

preparing a tactile sensor which is put into an active state to provide a tactile sense to a user for notifying when the cursor is close to at least one of the visible items; and stimulating a tactile element located on a surface of said tactile sensor, in dependency upon a positional relationship between the position of the cursor and at least one of the visible items to notify the user of the positional relationship.

2. A pointing system for use in an interactive system to indicate a coordinate position on a screen of a graphical user interface by moving a cursor on said screen which displays visible items together with the cursor, said pointing system comprising:

a position detecting unit for detecting a position of the cursor in relation to the visible items as said coordinate position to produce a position signal which is representative of the position of the cursor;

a relation detecting circuit for detecting a relationship between the position of the cursor and at least one of the visible items to produce a relationship signal which is representative of a relationship between the position and at least one of the visible items wherein said relationship signal is produced as the cursor moves within a vicinity of at least one of the visible items on said screen; and a tactile display unit driven by said relationship signal for providing a tactile sense to a user determined by said relationship signal.

3. A pointing system as claimed in claim 2, wherein said tactile display unit comprises:

control unit supplied with said relationship signal for producing a control signal in relation to said relationship signal;

a tactile display driven by said control signal for providing said tactile sense determined by the control signal to move the tactile sense determined by the a movement result signal representative of movement of said tactile display; and feedback means for said movement result signal to said position detecting unit to control the position of the cursor in response to the movement result signal.

4. A pointing system for use in an interactive system to indicate a coordinate position on a screen of a graphical user interface by moving a cursor on said screen which displays visible items together with the cursor, said pointing system comprising:

a position detecting unit for detecting a position of the cursor as a cursor position in relation to the visible items as said coordinate position to produce a position signal which is representative of the cursor position;

a relation detecting unit for detecting a relationship between the cursor position and a position of at least one of the visible items within a predetermined range of the cursor position to produce a relationship signal which is representative of the relationship; and a varying unit for varying at least one of a tactile sense and an inner force sense determined by said relationship signal for notifying a user of the relationship.

\* \* \* \* \*

UNITED STATES PATENT AND TRADEMARK OFFICE
CERTIFICATE OF CORRECTION

PATENT NO. : 5,714,978
DATED : February 3, 1998
INVENTOR(S) : Katsuhiro YAMANAKA et al.

It is certified that error(s) appears in the above-identified patent and that said Letters Patent is hereby corrected as shown below:

Col. 3, line 23, after "illustrated in" insert --Fig 6;--.

Col. 4, line 32, change "depleted" to --depicted--.

Col. 8, line 5, change "acts" to --dots--.

Col. 9, line 17, change "include a" to --included--.

Signed and Sealed this

Fifteenth Day of September, 1998

Attest:

BRUCE LEHMAN

Attesting Officer

Commissioner of Patents and Trademarks